(12) United States Patent
Hallin et al.

(10) Patent No.: US 6,754,661 B1
(45) Date of Patent: Jun. 22, 2004

(54) HIERARCHICAL STORAGE SYSTEMS FOR HOLDING EVIDENTIARY OBJECTS AND METHODS OF CREATING AND OPERATING UPON HIERARCHICAL STORAGE SYSTEMS

(75) Inventors: Philip J. Hallin, Redmond, WA (US); Keith R. Vogel, Duvall, WA (US); Kirt Debique, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/511,173

(22) Filed: Feb. 22, 2000

Related U.S. Application Data

(60) Provisional application No. 60/143,662, filed on Jul. 13, 1999.

(51) Int. Cl.[7] .................................................. G06F 7/00
(52) U.S. Cl. ............................. 707/100; 707/1; 707/2; 707/10; 707/104.1
(58) Field of Search ..................... 707/1–10, 100–104.1; 380/255, 30; 711/117, 122

(56) References Cited

U.S. PATENT DOCUMENTS

| | | | | |
|---|---|---|---|---|
| 5,166,939 A | * | 11/1992 | Jaffe et al. .................. 714/766 |
| 5,193,184 A | * | 3/1993 | Belsan et al. .................. 711/4 |
| 5,265,164 A | * | 11/1993 | Matyas et al. ................. 380/30 |
| 5,455,775 A | * | 10/1995 | Huber et al. .................... 716/7 |
| 5,457,791 A | * | 10/1995 | Matsumoto et al. ........... 714/5 |
| 5,649,190 A | * | 7/1997 | Sharif-Askary et al. .... 707/101 |
| 5,734,887 A | * | 3/1998 | Kingberg et al. ............... 707/4 |
| 5,809,516 A | * | 9/1998 | Ukai et al. .................. 711/114 |
| 5,897,661 A | * | 4/1999 | Baranovsky et al. ........ 711/170 |
| 5,924,094 A | * | 7/1999 | Sutter ........................... 707/10 |
| 5,958,078 A | * | 9/1999 | Yamamoto et al. ......... 714/766 |
| 6,023,709 A | * | 2/2000 | Anglin et al. ................ 707/204 |
| 6,029,141 A | * | 2/2000 | Bezos et al. .................. 705/27 |
| 6,041,421 A | * | 3/2000 | Yamamoto ..................... 714/7 |
| 6,044,155 A | | 3/2000 | Thomlinson et al. |
| 6,243,814 B1 | * | 6/2001 | Matena ....................... 713/200 |
| 6,272,631 B1 | | 8/2001 | Thomlinson et al. |
| 6,275,867 B1 | * | 8/2001 | Bendert et al. ............. 709/316 |
| 6,321,219 B1 | * | 11/2001 | Gainer et al. .................. 707/3 |
| 6,329,985 B1 | * | 12/2001 | Tamer et al. ................ 345/853 |
| 6,336,121 B1 | * | 1/2002 | Lyson et al. ................ 707/201 |
| 6,385,626 B1 | * | 5/2002 | Tamer et al. ............... 707/203 |
| 6,385,706 B1 | * | 5/2002 | Ofek et al. .................. 711/162 |
| 6,389,535 B1 | | 5/2002 | Thomlinson et al. |
| 6,401,120 B1 | * | 6/2002 | Gamache et al. ........... 709/226 |
| 6,438,705 B1 | * | 8/2002 | Chao et al. ..................... 714/4 |
| 6,457,007 B1 | * | 9/2002 | Kikuchi et al. ............... 707/10 |
| 6,487,622 B1 | * | 11/2002 | Coskrey et al. ............. 710/241 |

\* cited by examiner

*Primary Examiner*—Greta Robinson
*Assistant Examiner*—Linh Black
(74) *Attorney, Agent, or Firm*—Lee & Hayes, PLLC

(57) ABSTRACT

Hierarchical storage systems for holding objects used for evidentiary purposes, and methods of manipulating such systems are described. A logical store is provided and one or more physical stores are associated with and accessible through the logical store. Access to the physical stores can take place through the logical store with a single call to an appropriate application programming interface. Associations within and amongst stores can be define. One particular type of association is a context link which enables one evidentiary object in one physical store to get its context from another evidentiary object in another physical store.

43 Claims, 13 Drawing Sheets

Certificates

HIERARCHICAL STORAGE SYSTEMS FOR HOLDING EVIDENTIARY OBJECTS AND METHODS OF CREATING AND OPERATING UPON HIERARCHICAL STORAGE SYSTEMS

RELATED APPLICATION

This application claims priority from U.S. Provisional Application Serial No. 60/143,662, filed Jul. 13, 1999, the disclosure of which is incorporated by reference herein.

TECHNICAL FIELD

This invention relates generally to cryptography and, more particularly, to methods and systems for managing electronic information that can be used for verification and authentication such as digital certificates.

BACKGROUND

Cryptography provides a set of techniques for encoding data and messages such that the data and messages can be stored and transmitted securely. Cryptography can be used to achieve secure communications, even when the transmission media (for example, the Internet) is untrustworthy. Using cryptography, it becomes possible to verify the authenticity and origin of data and messages using evidentiary information such as digital signatures and digital certificates. Management of such evidentiary information can pose significant challenges particularly when the volume of such information becomes large, as will become apparent below. Before discussing problems associated with management of evidentiary information, however, some background information on cryptography in general will be useful in understanding how and where the inventive methods and systems fit.

One aspect of cryptography makes use of so-called public and private key pairs. The key pairs are mathematically related, e.g, derived from extremely large prime numbers, such that it is computationally infeasible to derive one key from the other. In public key cryptography, the public key is made public while the private key is kept private. The private key typically never leaves the machine on which it was generated. Accordingly, when using public key cryptography, the only component that must remain secret is the private key. In public key cryptography, information that is encrypted with one of the public or private keys can only be decrypted with the other of the public or private keys.

FIG. 1 illustrates a computer network that makes use of public and private keys. In the illustrated example, there are two users—Alice and Bob, that desire to send protected messages to one another. If Bob wishes to send Alice a secure email message, he can encrypt the email message with Alice's public key. When Alice receives the message, she can decrypt it using her private key. Bob should have access to Alice's public key because, after all, it is public. If, on the other hand, Alice wishes to send a secure email response to Bob, she can simply encrypt the email message with Bob's public key and send it to Bob. Since only Bob's private key can decrypt messages encrypted with Bob's public key, Alice can be assured that the message is private between her and Bob. In addition to providing privacy, public key cryptography can be used to provide integrity. The notion of a digital signature can be used to sign documents and software.

FIG. 2 illustrates a computer network in which a digital signature is utilized. A digital signature can be produced by passing a file, such as an email message, through a specific one-way hashing algorithm. The hashing algorithm produces a much smaller bit stream, e.g. 128-bits or 160-bits, often termed a message digest. The message digest is a unique value that acts as a fingerprint for the file. Because of the nature of the hashing algorithms, a one-bit change in the message can produce a change in roughly one half of the bits in the message digest. This helps to ensure that the recipient receives the actual file that was sent, and not a modified or altered version as will become apparent below. Once a message digest is created, it can be encrypted using the signer's private key and attached to the file when it is sent. Thus, in this example, Bob can produce a hash of his email message to Alice to provide a message digest, encrypt the message digest with his private key, and attach the encrypted message digest to the email message as his digital signature. To verify the integrity of the file, the application opening the file on Alice's end, e.g. Alice's email program, first uses the same hashing algorithm to produce her own message digest of the file. The application then decrypts the signature attached to the file by using Bob's public key to recover the original message digest produced when the file was originally signed. The two message digests are then compared by Alice's software. If any part of the message digests do not match identically, then the contents of the file have been modified or corrupted and cannot be trusted.

FIG. 3 illustrates a computer system in which a session key is used. A session key can be thought of as a secret that is "shared" between Alice and Bob.

Specifically, Bob can create a session key and use it to encrypt his email message to Alice. After Bob encrypts the email message with the session key, he can encrypt the session key with Alice's public key and transmit it to Alice. Alice can then decrypt the session key using her private key. With the decrypted session key, Alice can now decrypt the encrypted email message, run the hash to produce the message digest, and process it as described above.

One problem with the above scenario stems from the fact that someone, other than Bob, could conceivably masquerade as Bob by fraudulently holding out a public key that is represented to be "Bob's public key". Any messages that are intended for Bob and encrypted with the fraudulent public key, could conceivably then be decrypted with the accompanying private key by a person other than Bob. This person would then have access to information that was intended by the sender only for Bob. To address this, as well as other situations, the notion of a digital certificate is used. Digital certificates can be used both to ensure that Bob's public key is, in fact, his public key, and to a lesser degree, to ensure that Bob's private key has not been compromised.

A digital certificate can be thought of as an electronic counterpart of an ID card, such as a driver's license or passport. The validity of a digital certificate is based on systems similar to those used to issue physical ID cards. Specifically, information, e.g. information from and about Bob, is provided to a trusted public body called a certification authority, such as VeriSign, Inc. The certification authority validates the information and then issues a digital certificate. The digital certificate contains information about who the certificate was issued to, as well as the certification authority that issued it. For example, the digital certificate can contain Bob's email address, and the company and division he works for, etc. The certificate also contains Bob's public key. In addition, the certificate contains a digest of the certificate's contents that is signed with the private key of the certification authority to ensure that the certificate has not been altered or forged. That is, the certification authority first creates a hash of the certificate contents, and then encrypts the hash with its private key. Any application having the public key of the certification authority can decrypt the digest and check it against their own hash. If the digests match up, then the certificate can be trusted. If the digests do not match up, then the certificate cannot be trusted. When it comes to certificates, trust is very important. In the above example, Alice and Bob must both trust the certification authority that issues the certificates.

Certification authorities can have their own certificates that can be used to validate that anything signed by the certification authority is, in fact, authentic. To do this, so-called self-signed certificates are used. Self-signed certificates, also referred to as "root certificates", are issued and signed by certification authorities. Thus, the self-signed certificates must be trusted as being valid. Additionally, some certification authorities may themselves be certified by a hierarchy of one or more certification authorities. When a digital certificate is used to sign documents and software, this information is stored with the signed item in a verifiable form so that it can be displayed to a user to establish a trust relationship.

FIG. 4 illustrates one process for initially receiving a digital certificate. To begin with, an individual's software generates a public-private key pair. A certificate request containing the public key and signed with the user's private key is then sent to a certification authority or certificate server. The private key is maintained on the individual's machine. After a validation process in which the individual must prove that they are who they claim to be, the certification authority issues a digital certificate. The digital certificate has contents that include user information, public key, an encrypted certificate digest, and an identification of the certification authority that issued the certificate. The digital certificate is then stored by the individual's software and can then be made public.

When an individual such as Alice wishes to send Bob a message that is encrypted with Bob's public key, she can do so by using Bob's certificate (which contains his public key). Alice, or more accurately Alice's software, should first confirm that Bob's certificate, and hence public key, is valid. To do this, Alice must first get a copy of Bob's certificate. This can be done by having Bob send his certificate to Alice via email, through HTTP, or any suitable way. Alice can then store Bob's certificate in her personal store for future use. Once she has the certificate, as shown in FIG. 5, the first thing that Alice's software does is to look inside Bob's certificate to ascertain the certification authority that signed the certificate. Alice's software then decrypts the certificate digest using the certification authority's public key. So, for example, assume that VeriSign issues Bob's certificate. If Alice is using Microsoft's Internet Explorer (IE), IE can look inside Bob's certificate and ascertain that VeriSign issued it. IE can then check to see whether it has VeriSign's certificate loaded. If it does, then it can simply use VeriSign's public key to decrypt the certificate digest. Alice's software then makes its own digest of Bob's certificate using the same hash function that VeriSign used and compares the two digests. If the digests are the same, then Alice knows that (1) noone has tampered with the contents of the certificates, and (2) that the certifying authority (e.g. VeriSign) issued that certificate. Additionally, Alice's software can check to ensure that Bob's certificate has not expired by checking the expiration date of the certificate. Further, Alice's software can make an additional check of a so-called certificate revocation list (CRL). A CRL is simply a list of certificates that have been revoked. A certificate can be revoked, for example, if Bob's private key gets compromised on his machine. There are also so-called certificate trust lists (CTLs). CTLs are simply lists of trusted entities. As used in this document, the term "certificate"0 will be understood to include, without limitation, certificates, CRLs, and CTLs. Once Alice's software has ascertained that Bob's public key is valid, Alice can then use the public key to encrypt messages to Bob.

Many entities, other than individual users such as Alice and Bob can have certificates. For example, a web server can have a certificate. Web server certificates can be used by browsers for Secure Socket Layer (SSL) communication. That is, when a browser connects to a web server (e.g. to make an online purchase), it can use the web server's certificate to authenticate that the web server is, in fact, who it says it is. A browser or a browser user can have a client authentication certificate. These certificates can be used to verify that the clients are who they say they are. Certificate chains are also possible. For example, VeriSign can issue a certificate to Foo Corporation. Foo Corporation can, in turn, issue certificates to its various departments. The individual departments can then issue certificates to its various employees. An advantage of certificate chains is that all of the entities can verify with VeriSign that the certificates are valid.

As one can imagine, a user site can, over time, collect many certificates. Typically, a site has certificates for the user of the site, and other certificates describing those individuals and entities with whom the user communicates. For each entity, there can be more than one certificate. For each individual certificate, there should be a chain of verifying certificates that provides a trail back to a trusted root certificate. As the number of certificates, CRLs, and CTLs in a user's collection grows, the organization of those certificates becomes an issue. In the past, separate stores have typically been created to keep different kinds of certificates. For example, and as shown in FIG. 6, there might be separate stores for root certificates, certifying authority certificates, and user certificates. This solution creates a problem because an application might need to search several different stores to find a specific certificate. This can create processing complexities because of the number of places an application might have to look. For example, an application might go to a first store, open it and enumerate all of the certificates. If the certificate of interest is not found, the application might proceed to a second store and repeat the process. The application might have to repeat this process many times before finding the certificate of interest.

FIG. 7 illustrates this process for three different physical stores each of which contains a plurality of certificates. Assume that the rightmost certificate (shaded for clarity) is the certificate of interest for an application. In order to find that particular certificate, the application might first have to separately check each of the first two physical stores. Only when the application checks the last store will it find the certificate of interest. This problem is only compounded as the number of physical stores increases. Having an application separately access each physical store, enumerate the contents, check the contents for the certificate of interest, and proceed to the next physical store if the certificate of interest is not found is not an efficient use of an application's resources.

Another problem concerns duplicative stores and the inability to share information between stores. Specifically, each user will typically have their own stores to store certificates of interest. Each user's stores can include a root store for holding root certificates, a certification authority store for holding the certificates of the certification authorities, and an individual store for holding an individual's selected certificates. Each individual is typically responsible for maintaining their own store or stores. So, for example, each individual has to manage and physically oversee which certificates are placed into their particular stores. This can result in duplication of effort, particularly when different users might want to trust the same root certificates, i.e. maintain the same certificates in their stores. Moreover, memory resources can be undesirably consumed when the same certificates are held in a number of different stores.

Another problem that is associated with certificate stores is the inability of the stores to flexibly meet the needs of its users. Such needs might include the ability to create user-defined stores, manipulate the contents of the stores and the stores themselves, and establish relationships between the stores that improve the economics of store utilization. Specifically, certificate stores are typically isolated stores that might be located on a local machine. These stores do not have contact with, nor are they associated with other stores that might be present on the same local machine. This is not desirable particularly in view of trying to optimize computing resources.

Accordingly, this invention arose out of concerns associated with providing improved methods, systems, and architectures for creating and managing hierarchical storage systems for holding evidentiary objects such as digital certificates.

SUMMARY

Hierarchical storage systems for holding objects such as digital certificates that are used for evidentiary purposes, and methods of manipulating such systems are described.

In the described embodiment, a logical store is provided or defined and one or more physical stores are associated with and accessible through the logical store. The physical stores can be located on the same machine or across machine boundaries. Access to the physical stores can take place through the logical store with a single application program call to an appropriate application programming interface. In addition, physical or logical stores can be grouped into collection stores in which an operation on one store of the collection is carried through to all of the physical or logical stores of the collection store.

In another aspect, logical and physical stores are configurable and thus, can be defined and manipulated by a user. For example, in one implementation application programming interfaces are provided that enable a user to operate upon both logical and physical stores. A user, through an application program, can register (add) and unregister (remove) both logical and physical stores, as well as build associations within and amongst the stores. These buildable associations can promote economies, such as sharing, between the stores.

One particular type of association is a context link. A context link enables one evidentiary object in one physical store to get its context from another evidentiary object in another physical store. This obviates the need to keep many different physical copies of the same evidentiary object in many different physical stores. Thus, memory resources are used more efficiently.

DETAILED DESCRIPTION

Overview

Figure 1:
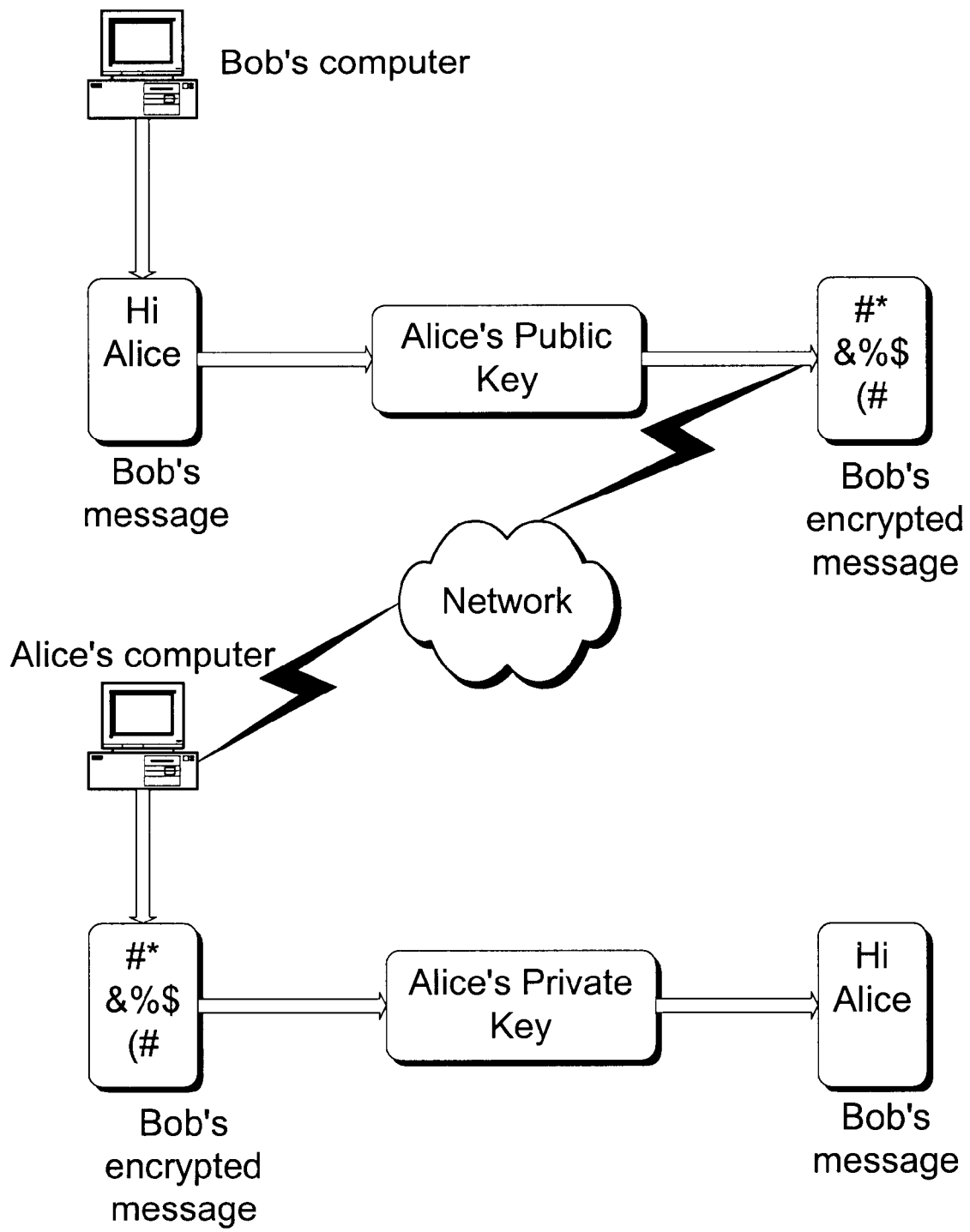
FIG. 1 is a diagram that gives some background information on the use of public and private key pairs.
Figure 2:
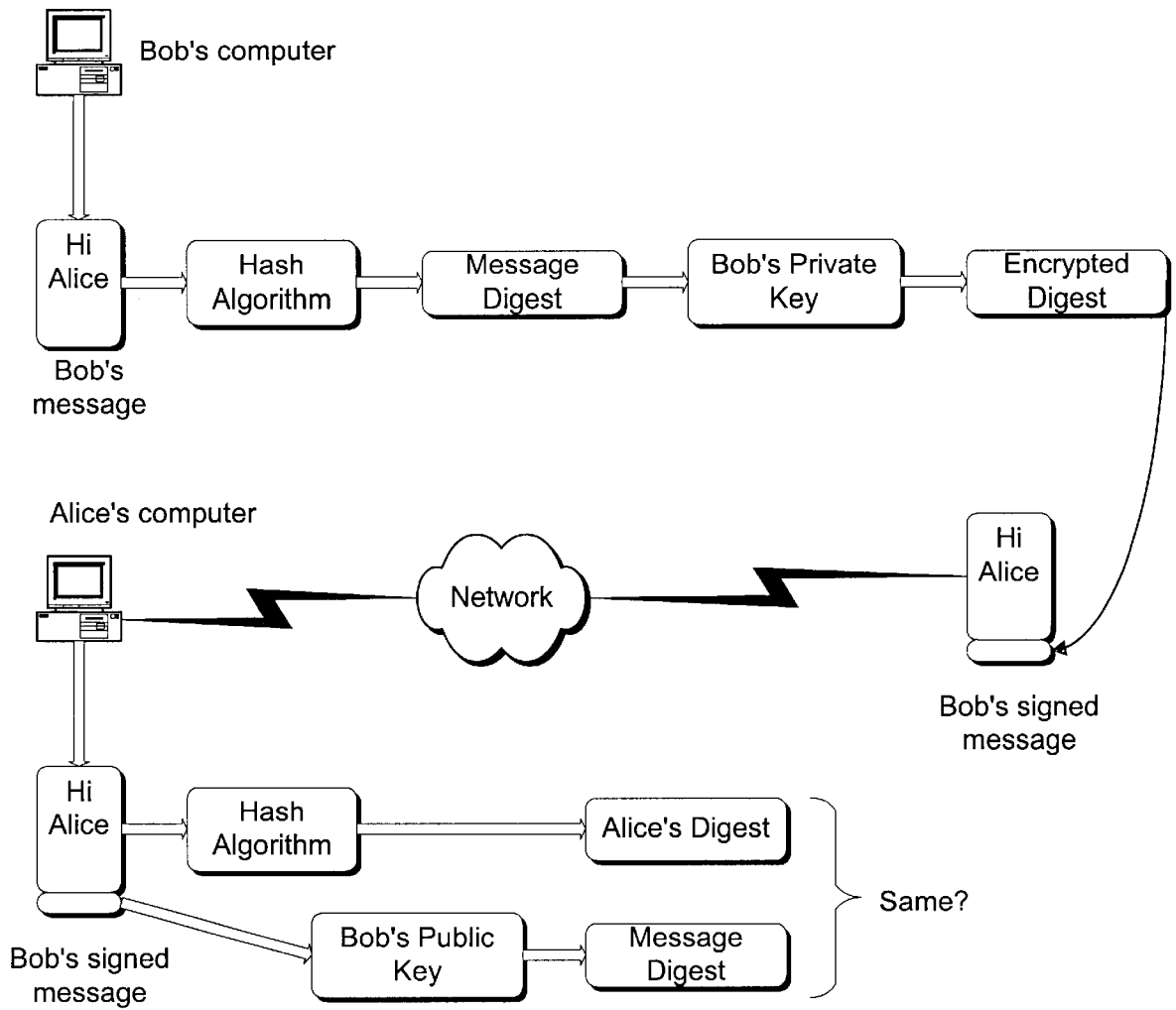
FIG. 2 is a diagram that gives some background information on the use of public and private key pairs.
Figure 3:
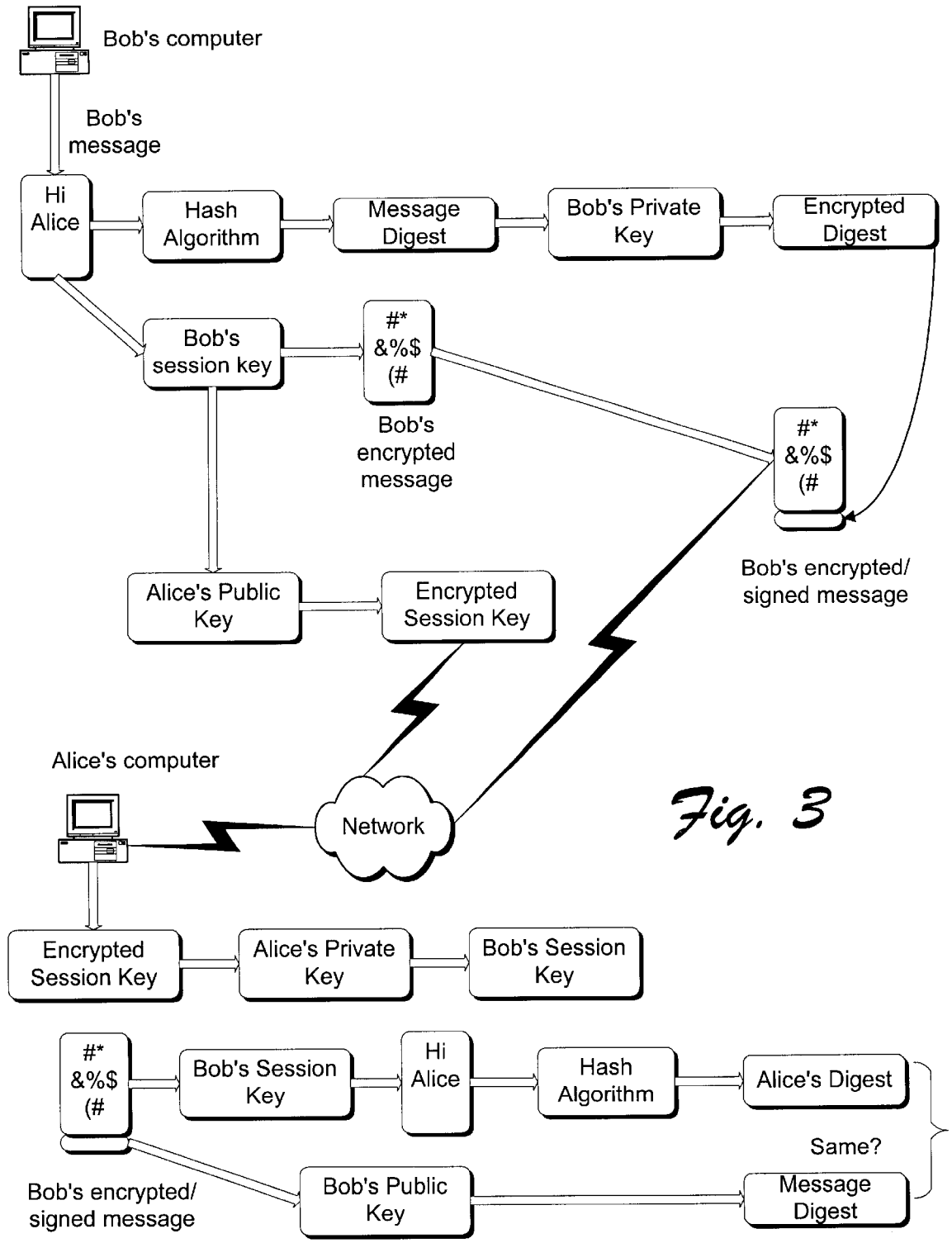
FIG. 3 is a diagram that gives some background information on the use of public and private key pairs.
Figure 4:
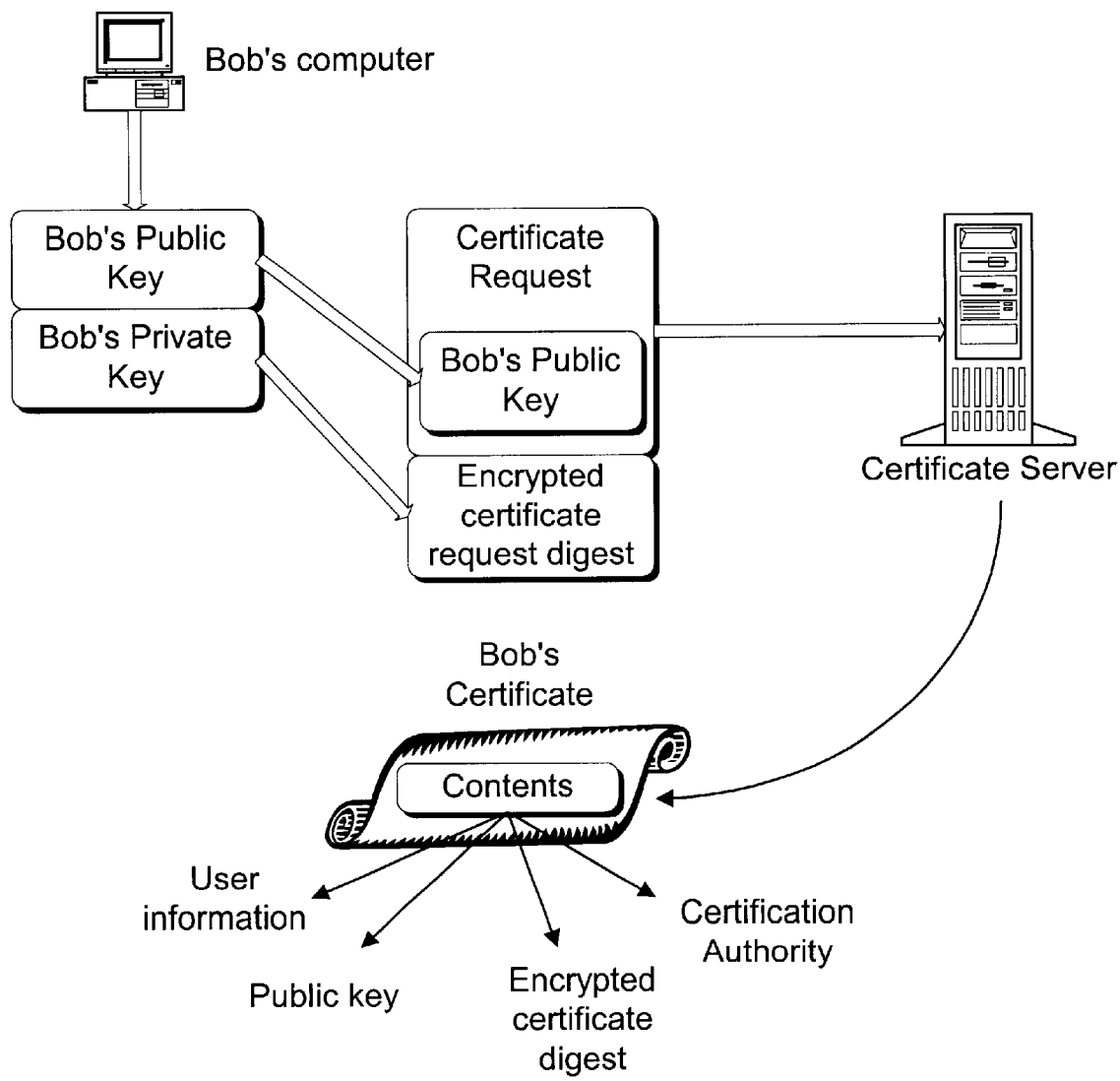
FIG. 4 is a diagram that gives some background information on evidentiary objects in the form of digital certificates.
Figure 5:
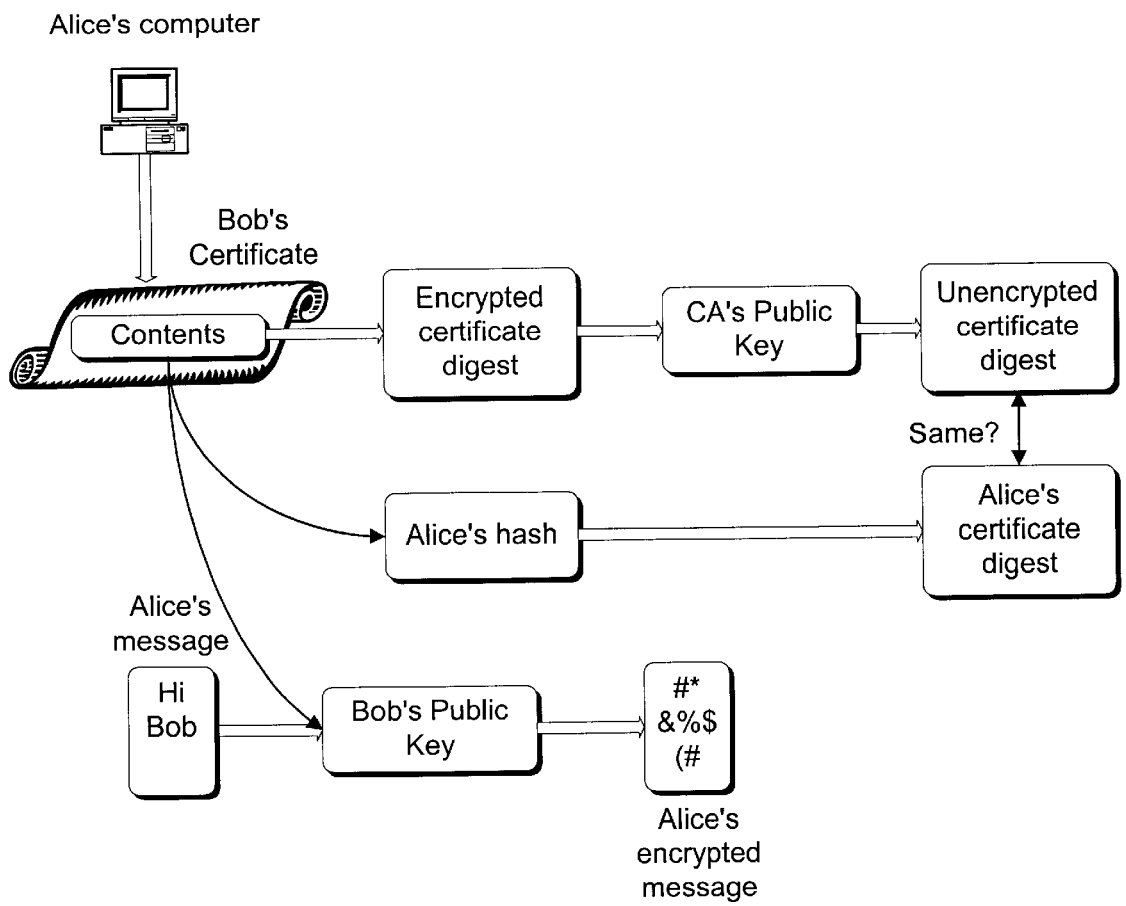
FIG. 5 is a diagram that gives some background information on the use of digital certificates and public and private key pairs.
Figure 6:
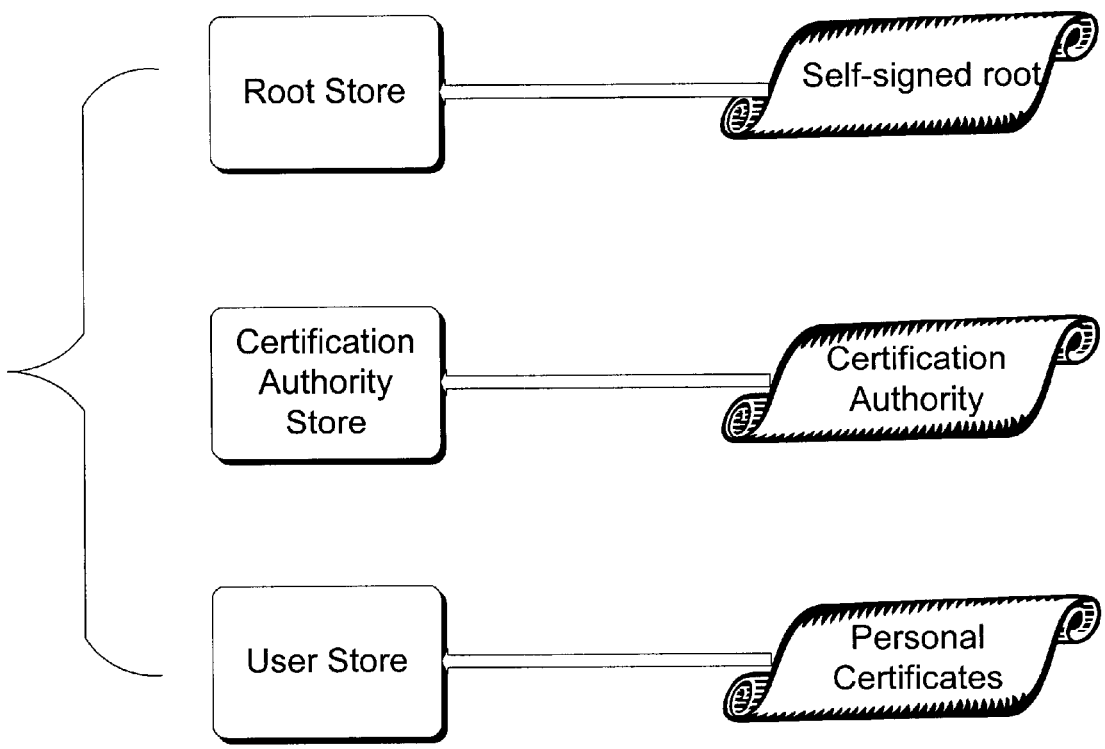
FIG. 6 is a diagram that describes three exemplary certificate stores for different types of digital certificates.
Figure 7:
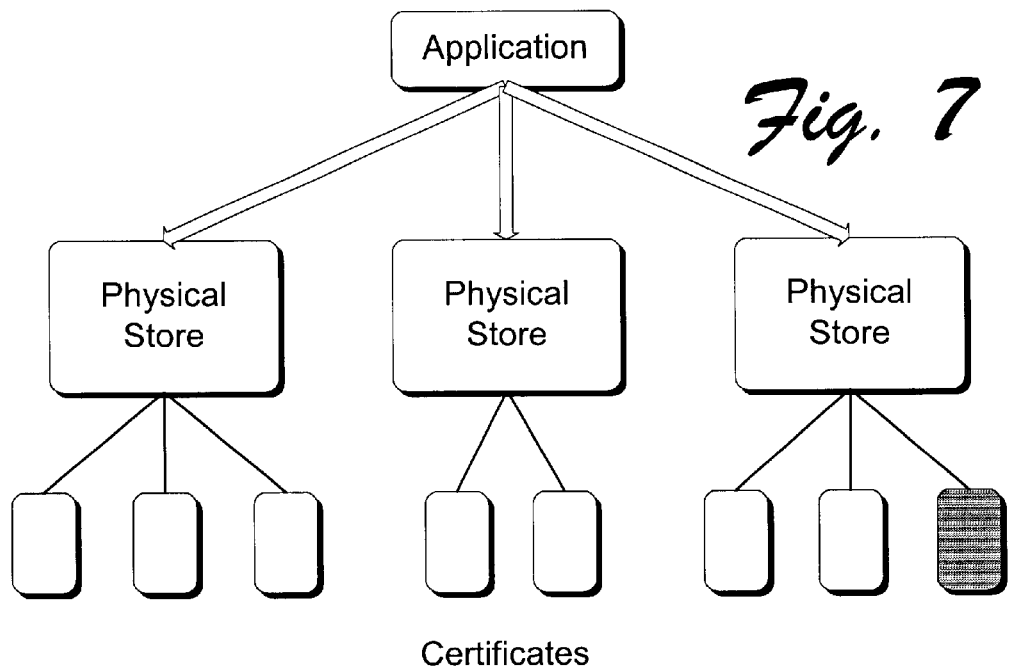
FIG. 7 is a diagram that illustrates an application program accessing physical stores in accordance with the prior art.

Aspects of the invention provide hierarchical storage methods and systems for holding objects that can be used for evidentiary purposes. In the described embodiment, the evidentiary objects comprise digital certificates. It is to be understood, however, that the principles of invention could be utilized in connection with evidentiary objects other than digital certificates. Such other objects can include, without limitation, any form or format of data that is capable of being stored and used for evidentiary purposes such as authentication. One 11 specific type of object is a biometric object. Biometric objects can include fingerprint, facial, and voice templates that can be used for authentication purposes.

The described approach presents various organizations of digital certificate stores and techniques of operating upon and manipulating the stores that greatly facilitate their use in maintaining, organizing and overseeing the management of digital certificates. Rather than having separate certificate stores that each require separate operations to be invoked by an application program, the capability is provided to unite or associate one or more physical stores together. In this manner, operations that are performed on one store can automatically be performed on another store, e.g. an enumeration operation that enumerates all of the certificates in a store now can enumerate all of the certificates in all of the associated stores. In the described embodiment, the concept of a "logical store" is utilized to unite or associate a number of different physical stores together. Access to all of the underlying physical stores now occurs through the logical store, rather than separately through each independent physical store. Thus, applications can now operate only on the logical store and thereby operate on all of the associated physical stores underlying the logical store.

Flexibility is also provided in that a user can create their own hierarchies of logical and physical stores, or modify stores that are already in existence. In the described embodiment, such flexibility is embodied in a set of application programming interfaces that allow a user to register, unregister, and perform many other operations on physical and/or logical stores. Thus, a user can adapt a logical or physical store to meet their own unique needs. Logical stores can also have associated predefined physical stores that assist a user in organizing digital certificates.

Economies can be achieved through the promotion of sharing amongst various certificate stores. For example, physical stores can belong to more than one logical store. In this manner, certificate resources can be shared among logical stores. In addition, the concept of a "collection store" is used to group two or more physical or logical stores together. Collection stores can be separate from or incorporated into one or more logical stores. Economies can also be achieved through the use of so-called "context links". A context link enables individual certificates to be included in more than one physical store without the need to physically copy the certificate into the other stores. This can save memory resources particularly when the size and/or numbers of affected certificates is large.

Accordingly, aspects of the inventive methods and systems provide a robust, flexible, and configurable approach to solving many of the problems previously associated with certificate stores.

Exemplary Computer System

Figure 8:
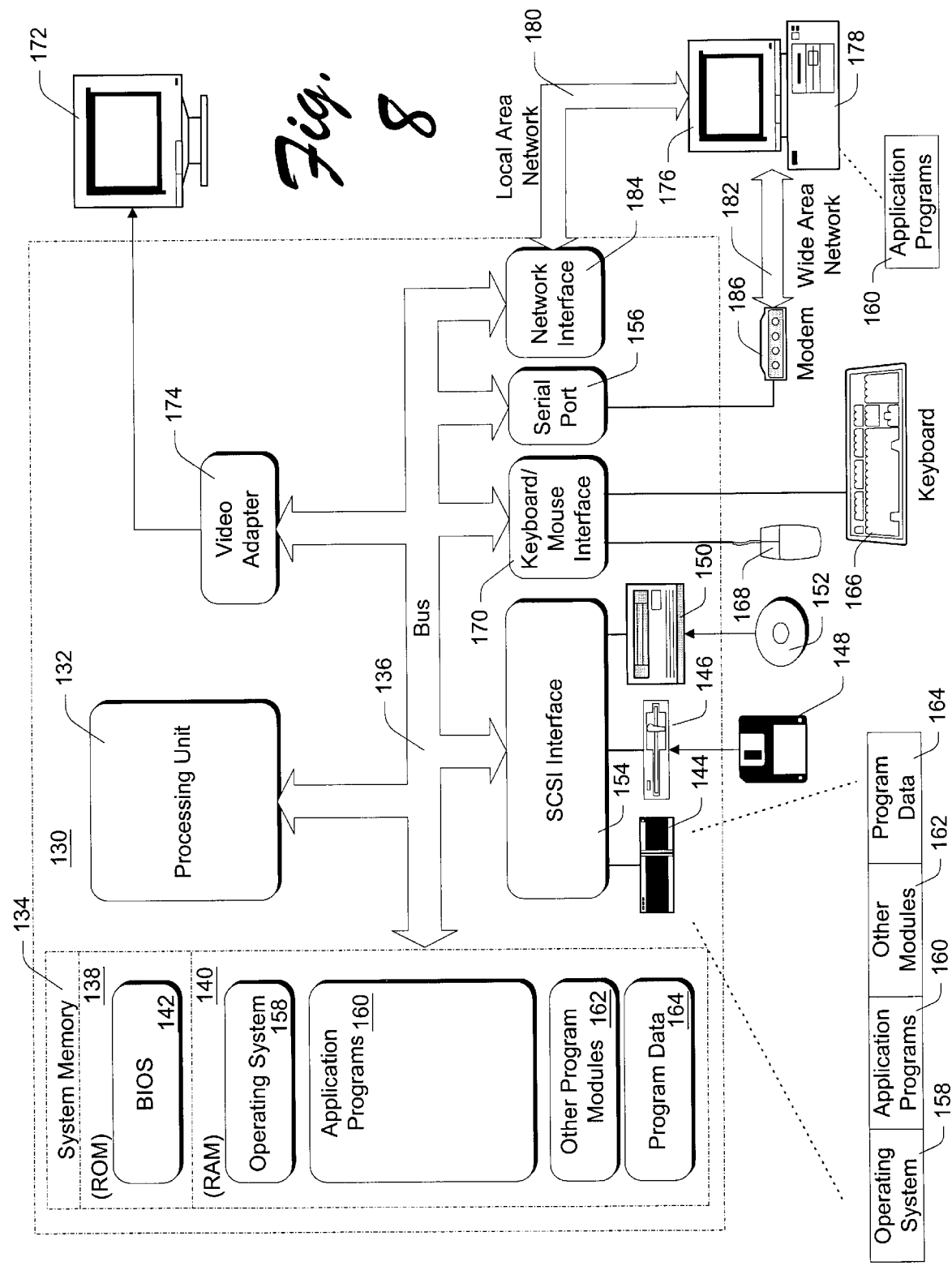
FIG. 8 is a diagram of an exemplary computer system that can be used to implement various embodiments of the invention.

Preliminarily, FIG. 8 shows a general example of a computer 130 that can be used in accordance with the invention. Various numbers of computers such as that shown can be used in the context of a distributed computing environment. In this document, computers are also referred to as "machines".

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 8. The logical connections depicted in FIG. 8 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Certificate Store Organization

Figure 9:
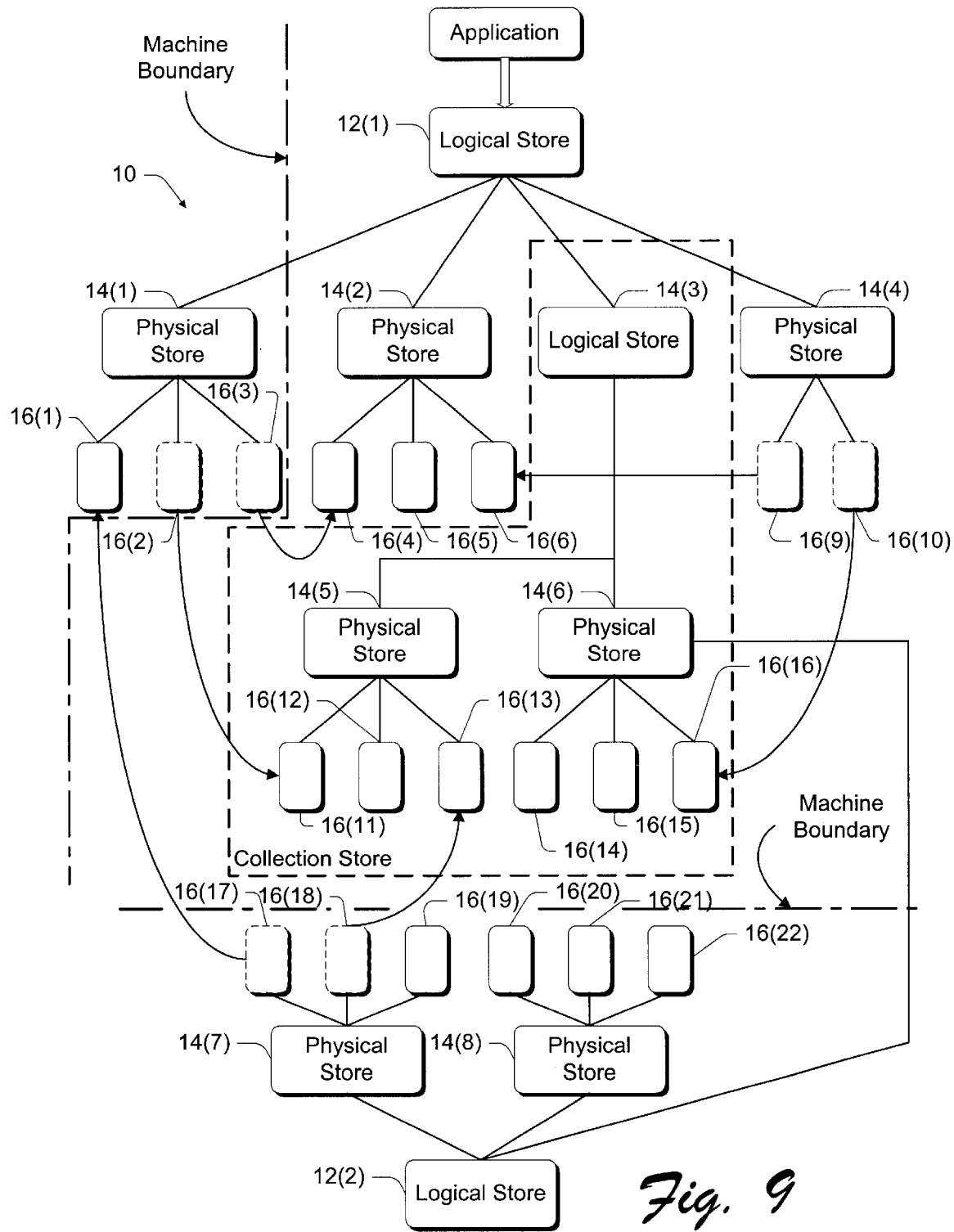
FIG. 9 is a diagram of an exemplary hierarchical storage system.

FIG. 9 shows one possible organization of certificate stores in accordance with principles of the described embodiment generally at 10. It is to be appreciated that several different concepts have been combined in the illustrated example to underscore the flexibility that can be afforded by the described embodiment. The organization defines a hierarchical storage system. One aspect of the system that is particularly advantageous is that a user, through an application program, can build and configure their own hierarchies through one or more calls to a set of application programming interfaces that are described in more detail below.

In practice, any organization of certificate stores can have one or more logical stores. A logical or "virtual" store can be thought of as a central starting point for operating upon other stores that comprise constituent members of the logical store. A logical store can contain physical stores as well as other logical stores. In the described example, there are three logical stores 12(1), 12(2), and 14(3). Each logical store, in turn, can have one or more physical or logical stores associated with and accessible through the logical store. The physical stores are used to store evidentiary objects which, in this example, comprise digital certificates or context links. As will be discussed below in more detail, each logical store has a logical store provider that is associated with it. Logical store providers are software components that are programmed to receive calls from an application program and then take the steps that are necessary to operate upon the physical stores that are associated with the logical store. There can be different types of physical stores, e.g. registry stores, file system stores, and database stores.

In the described embodiment, each physical store has a physical store provider that is programmed to open or otherwise operate upon the physical store with which it is associated. The physical store providers are called by the logical store provider and, in turn, take appropriate steps to operate upon their associated physical store. As there can be different types of physical stores, each of the providers that are associated with these different types of stores is separately programmed to interface and interact with their type of store. This enhances the flexibility of the system.

Here, logical store 12(1) includes physical stores 14(1), 14(2), and 14(4). Logical store 12(1) also includes logical store 14(3) which, in turn, includes physical stores 14(5) and 14(6). Logical store 12(2) includes physical stores 14(6)–14(8). The physical stores can be located in many different physical locations. For example, physical stores can be located in the registry on a local or remote computer, a disk file, a database, directory service, a smart card, or any other suitable location. Each of the physical stores has one or more digital certificates that they hold. In the described example, the certificates are designated at 16(n), where "n" can be any number. In the described organization, physical stores can be members of more than one logical store. So, for example, physical store 14(6) is a member of logical stores 12(1), 14(3), and 12(2). When a logical store is opened by an application, all of the member physical stores can be opened as well. Thus, rather than having to go and individually open a plurality of different physical stores in order to operate on them, an application need only open one logical store to access all of its underlying physical stores.

Adding and Removing Logical and Physical Stores

One aspect of the invention allows a user to create their own hierarchical store system. This is achieved by allowing a user to add their own defined logical and physical stores. In one specific implementation, a set of application programming interfaces are provided that allow a user, through an application program, to add and remove logical and physical stores to either create their own hierarchy or modify an existing one.

Figure 10:
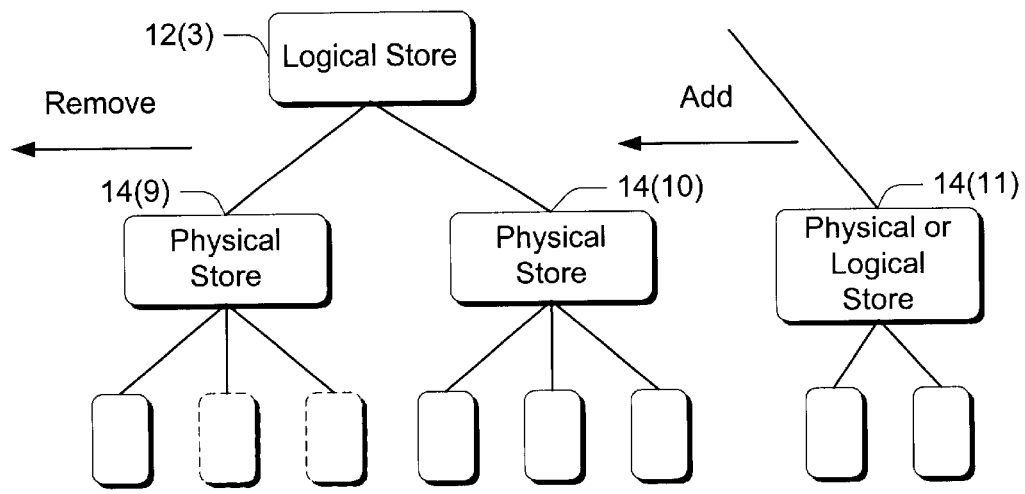
FIG. 10 is a diagram that illustrates exemplary ways in which a hierarchical 11 storage system can be manipulated by a user.

FIG. 10 shows one example of how this might occur. There, logical store 12(3) has been defined to have certain predefined physical stores 14(9) and 14(10). The predefined physical stores can be located in any location as indicated above. Assume that a user wishes to add an additional physical or logical store to logical store 12(3). To do so, the user invokes an application programming interface that enables the user to specify a logical store, e.g. logical store 12(3) in which the new physical store is to be added, and to specify a physical or logical store—here physical or logical store 14(11). The specified physical or logical store 14(11) is then added to and becomes part of the specified logical store. Similarly, a user can remove physical or logical stores from various logical stores. To do so, the user invokes an application programming interface that enables the user to specify the logical store, e.g. logical store 12(3) in which the physical or logical store is to be removed and to specify the physical store—here physical store 14(9). The specified physical store 14(9) is then removed from the specified logical store. In this manner, a user has the flexibility to determine which physical stores and/or logical stores are members of their hierarchy.

Remote Stores

In the past, all of the certificate stores had to be created, opened and maintained on a local machine. Accordingly, all of the store operations had to take place on that local machine. There was no provision for opening and operating upon certificate stores located on remote machines. In accordance with the described embodiment, physical stores and logical stores can be created and operated upon on different machines, i.e. across machine boundaries. FIG. 9 shows physical store 14(1) as being located across a machine boundary from its companion physical stores. Additionally, logical store 12(2) is located across a machine boundary from logical store 12(1). In addition to being able to be opened locally, these stores can be opened remotely. All that is necessary to open a remote store is a specification of the computer on which the store is located and the store name. For example, "\<computer name>\<store name>". This format enables the operating software to ascertain a location (i.e. from the "computer name" field) of the particular store of interest, go to that location and open the certificate store. The ability to open stores across machine boundaries enhances flexibility and provides for a more robust source of certificate stores.

One particular application of this aspect is in the area of computer clusters. Specifically, many computers can be organized together as a cluster. Each of the different computers can, in turn, have one or more physical stores. These physical stores can be organized under one logical store. As access to the physical stores occurs through the logical store, the distributed nature of the physical stores is transparent to the program application. In one specific example, an application program can call a particular specified logical store provider which, in turn, can call the individual physical store providers that are associated with it. Through the use of remote protocols, these calls can be made across machine boundaries. Access to the remotely located physical stores is thus transparent to the application program.

Collection Stores

FIG. 9 illustrates another aspect of the invention—the concept of a collection store. A collection store is, as the name implies, a collection of physical or logical stores. As organized, an operation on a collection store can be carried across to all of the member physical stores. In one implementation, this is done by defining a collection store provider that is a specifically programmed software module that knows how to operate upon its member physical stores. Operation upon the physical stores by the collection store provider can include calling separate individual physical store providers that are each associated with a physical store of the collection.

Figure 11:
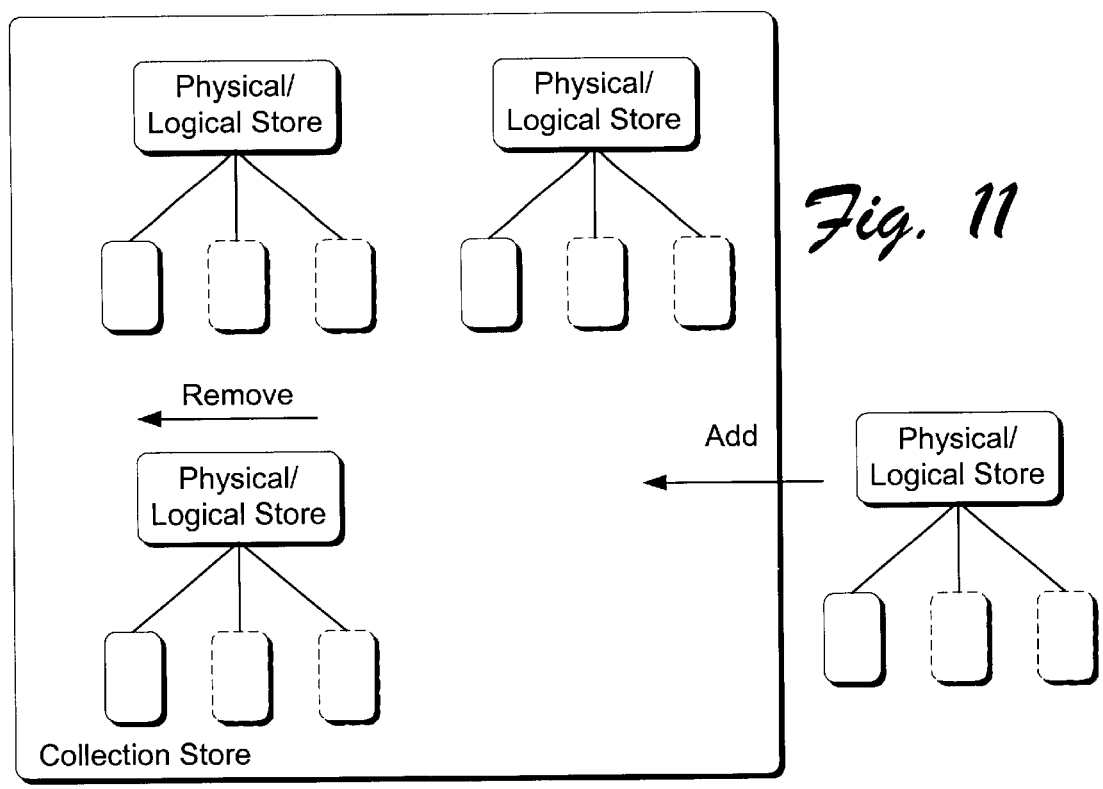
FIG. 11 is a diagram that illustrates exemplary ways in which a hierarchical storage system can be manipulated by a user.

Here, logical store 14(3) and physical stores 14(5) and 14(6) constitute an exemplary collection store. All of the certificates that are associated with each of the individual physical stores are now associated with the collection store. One of the advantages of collection stores is that they can be created by a user and modified to suit the user's needs. For example, FIG. 11 shows a collection store that contains three stores. These stores can be either physical stores or logical stores. If a user wishes to add a store to their collection store, they can simply invoke an application programming interface that enables a user to specify the collection store and the store to be added. Similarly, if a user wishes to remove a store from their collection store, they simply invoke an application programming interface that enables a user to specify the collection store and the store that is to be removed. A set of exemplary application programming interfaces is shown in the table below:

| Application Programming Interfaces | Description |
| --- | --- |
| CertAddStoreToCollection | Adds a specified store to a collection. |
| CertRemoveStoreFromCollection | Removes a specified store from a collection. |

To create a collection store, an application program makes a call to an application programming interface called CertOpenStore (described below) and specifies the collection store provider type. The collection store provider type is programmed and knows the steps to take to create collection stores.

A collection store need not necessarily be a member of a logical store—although FIG. 9 certainly indicates that such can be the case. The application programming interfaces described above give the user added flexibility in that they are free to incorporate stores as they choose into their own definable collection store. One advantage of collection stores comes from an application's standpoint. Specifically, in the past, if an application was looking for a particular certificate, it would have to physically go through each store and enumerate the certificates in each store. Now, an application need only invoke an enumeration method on one collection store in order to have all of the certificates in that collection enumerated. Other advantages are, of course, achieved as will be apparent to those of skill in the art.

Context Links

In the past, physical stores have stored physical copies of certificates. If a certificate that was stored in one physical store was desired to be located in another physical store, a copy of the certificate was made and stored in the other physical store. When large numbers of copies of the same certificate or even small numbers of copies of many different certificates are saved in different physical stores, undesirably large amounts of memory can be consumed. To address this and other problems, the concept of a context link is utilized. A context link is a link between physical stores that enables one certificate to populate both stores. This way, additional copies of certificates need not be made when they are desired to be present in other stores.

As an example, consider again FIG. 9. There, several context links have been established between different physical stores. Specifically, physical store s 14(1) has three context links associated with it. A first context link is to certificate 16(1) from certificate 16(17) of physical store 14(7). This means that certificate 16(17) gets its context from certificate 16(1). A second context link is from certificate 16(2) to certificate 16(11) in physical store 14(5). This means that certificate 16(2) gets its context from certificate 16(11). Similarly, a third context link is from certificate 16(3) to certificate 16(4) of physical store 14(2). Other context links are shown for certificates 16(9), 16(10), and 16(18).

In the described embodiment, the context links are implemented as pointers to the other certificates. Thus, when a certificate is added to a physical store, instead of creating a physical copy of the certificate, a pointer is added to the physical store that points to another certificate. This can greatly save on memory usage. In the described embodiment, a set of application programming interfaces is provided that can be called to add context links to physical stores. An exemplary set of application programming interfaces is shown in the table below:

| Application Programming Interfaces | Description |
| --- | --- |
| CertAddCertificateLinkToStore | Adds a certificate link to a store. |
| CertAddCRLLinkToStore | Adds a CRL link to a store. |
| CertAddCTLLinkToStore | Adds a CTL link to a store. |

Notification, Resynchronization, and Commit

Figure 12:
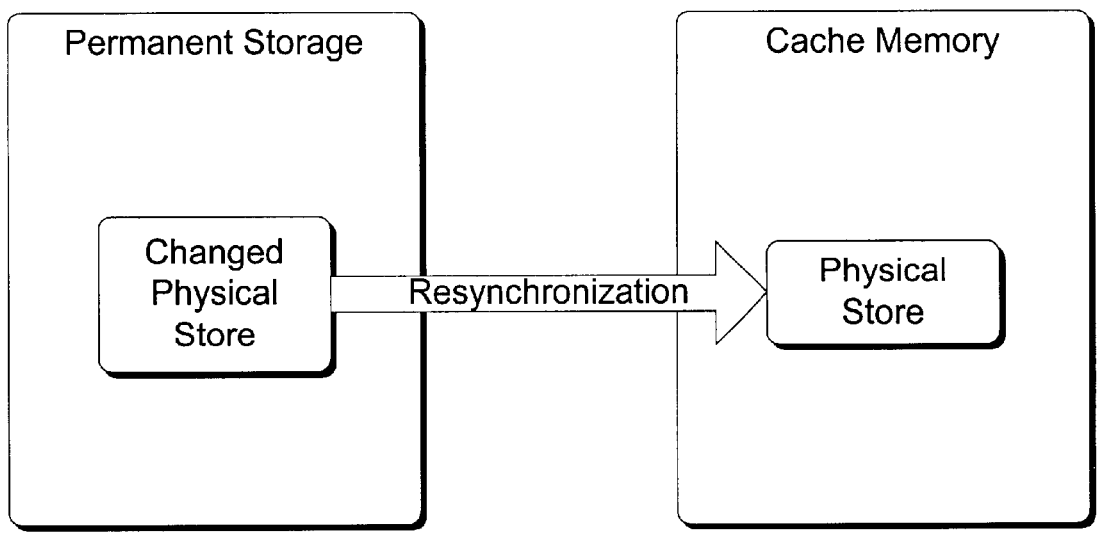
FIG. 12 is a diagram that is useful in understanding one aspect of the invention.

Certificates in a certificate store are typically kept or persisted in some kind of permanent storage such as a disk file or the system registry. Certificate stores can also be created and opened strictly in memory. A memory store provides temporary certificate storage for working with certificates. Sometimes during the course of operating on a certificate store, certain changes will be made to the certificate store. For example, a particular root certificate might be removed from the certificate store because it can no longer be trusted. As an example, consider FIG. 12. There, a physical store is shown in its persisted state in a permanent storage. In this example, the physical store has been modified or changed in some way. In accordance with the described embodiment, another thread or process can open a physical store and register for a notification event in the event that the physical store is modified. The notification event indicates to the thread or process that the physical store of interest has been modified. In this case, when the physical store was opened by the thread or process, it was read into cache memory, as indicated in FIG. 12. To get the physical store in the cache memory to be synchronized with the changed or modified physical store, an application can execute a "resynchronization" method which synchronizes the cached physical store with the changed or modified physical store in permanent storage. This method is more desirable than having to close and reopen the physical store.

Another aspect provides a "commit" method that enables changes that are made to a physical store to be committed as a single transaction rather than a number of independent transactions. In the described embodiment, the "commit" method finds particular utility in the context of a file physical store is opened and its contents are read into cache memory, certificates can be added or deleted. Once all of the changes have been made, a call to the "commit" method can be made at which time the changes are committed back to the file physical store in the permanent storage.

Figure 13:
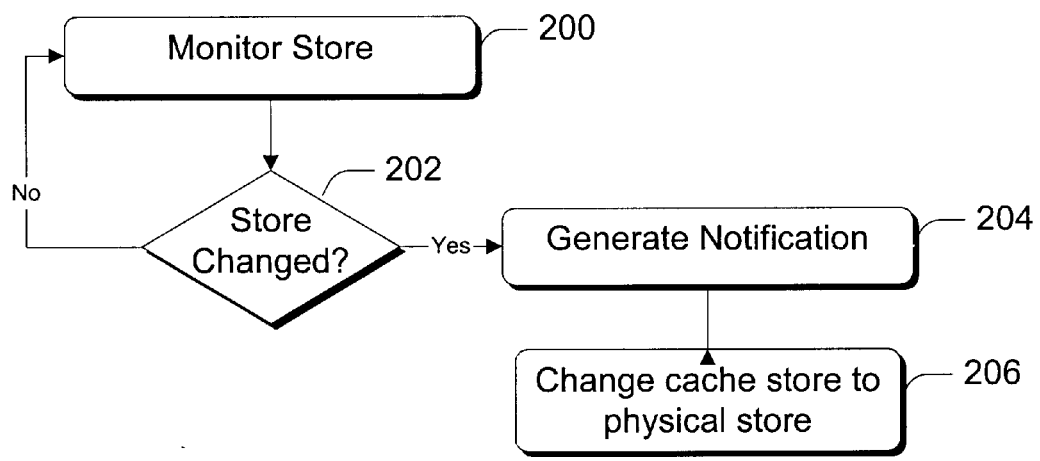
FIG. 13 is a flow diagram that describes a method in accordance with one embodiment of the invention.

FIG. 13 shows a flow diagram that describes steps in a method in accordance with this implementation. Step 200 monitors one or more physical stores for any changes that might take place. An exemplary change might be the removal or addition of a particular certificate. Step 202 determines whether a particular store has been changed. For example, this step can ascertain whether the contents of a cached store are different from the contents of the store that is persisted to storage. If a store has been changed, then step 204 generates a notification for an application. For example, when the persisted physical store is changed, for whatever reason, a notification is generated for whatever thread or process that has registered for such notification. Accordingly, step 206 resynchronizes the cached store with the changed physical store that is persisted in permanent storage.

Exemplary Application Programming Interfaces

Figure 14:
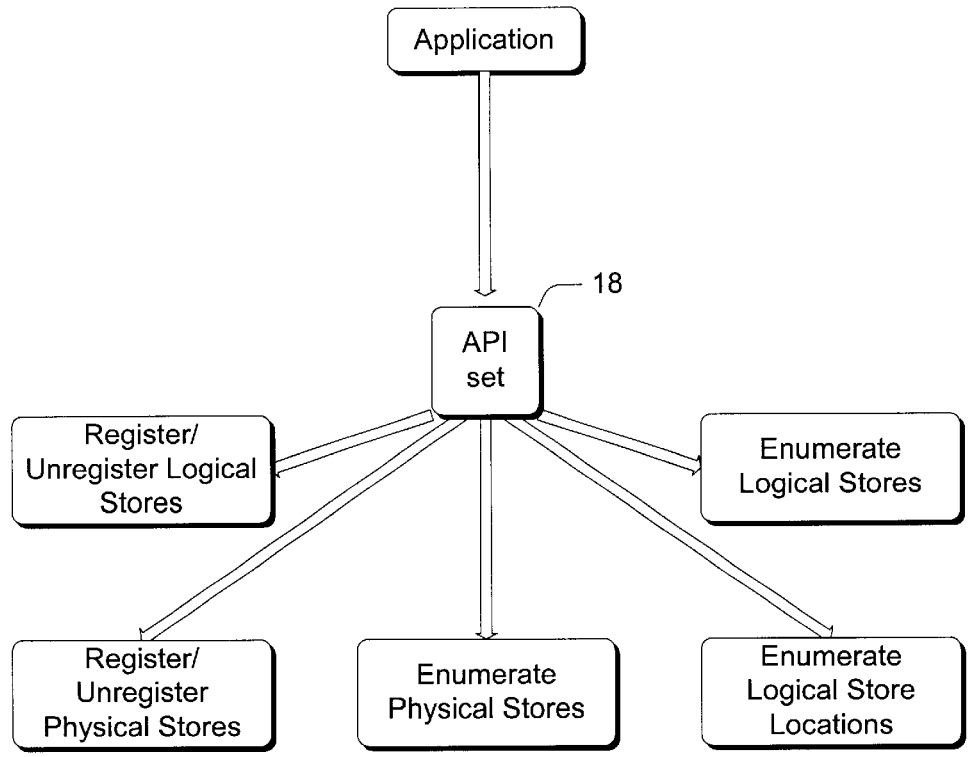
FIG. 14 is a diagram that illustrates architectural aspects of an embodiment of the invention.

FIG. 14 shows an exemplary software component 18 that represents a set of application programming interfaces (APIs) that are implemented in connection with the described embodiment. The APIs discussed below provide a great deal of flexibility insofar as giving the user the ability to create their own user-definable hierarchy of certificate stores—both logical and physical stores. In an exemplary implementation, the APIs were implemented as a set of APIs exported from a DLL for Microsoft's WIN32® operating system. In the described embodiment, a set of application programming interfaces are provided for registering, unregistering, and enumerating both system (e.g. logical) and physical stores. The set of application programming interfaces also includes interfaces for manipulating the contents of the stores as well as the stores themselves. Some of these interfaces were discussed above. An exemplary set of additional application programming interfaces is described in the table just below.

| Application Programming Interface | Description |
| --- | --- |
| CertCloseStore | Closes a certificate store handle. |
| CertControlStore | Allows an application to be notified when there is a difference between the contents of a cached store and the contents of the store that is persisted to storage. It also provides resynchronization of the cached store if necessary and provides a means to commit changes made in the cached store to persisted storage. |
| CertDuplicateStore | Duplicates a store handle by incrementing the reference count. |
| CertEnumPhysicalStore | Enumerates the physical stores for a specified system store. |
| CertEnumSystemStore | Enumerates all available system stores. |
| CertEnumSystemStoreLocation | Enumerates all of the locations that have an available system store. |
| CertGetStoreProperty | Gets a store property. |
| CertOpenStore | Opens a certificate store using a specified store provider type. |
| CertRegisterPhysicalStore | Adds a physical store to a registry system store collection. |
| CertRegisterSystemStore | Registers a system store. |

-continued

| Application Programming Interface | Description |
| --- | --- |
| CertSaveStore | Saves the certificate store. |
| CertSetStoreProperty | Sets a store property. |
| CertUnregisterPhysicalStore | Removes a physical store from a specified system store collection. |
| CertUnregisterSystemStore | Unregisters a specified system store. |

As FIG. 14 implies, using the set of application programming interfaces, a user, through a suitable application, can make calls on the software component 18 to register/unregister system (logical) stores, register/unregister physical stores, enumerate system and physical stores, as well as manipulate the contents of such stores, e.g. adding a store to a collection store. Through the described software component, user-definable, configurable hierarchies of logical and/or physical stores can be created and used.

Figure 15:
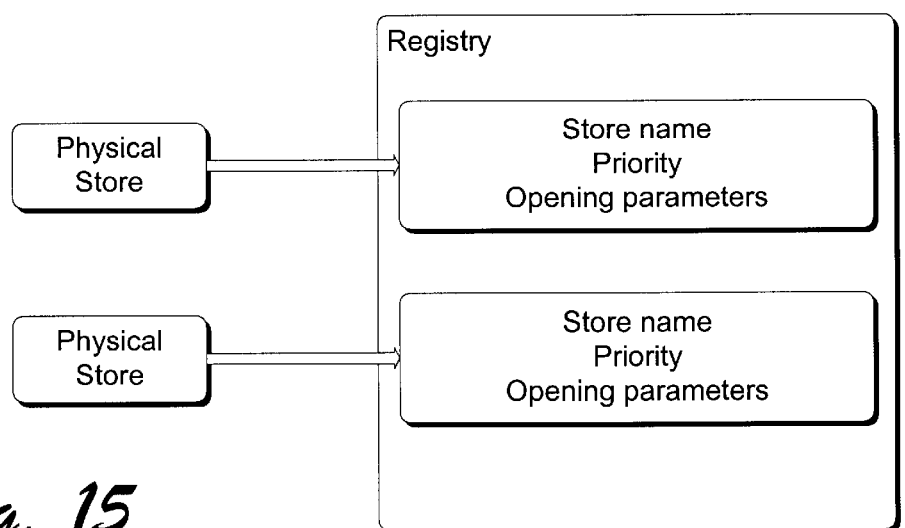
FIG. 15 is a diagram that illustrates architectural aspects of an embodiment of the invention.

When a user utilizes the software component 18 to define logical and physical stores, information is provided to the software component which then takes the appropriate steps to set up the logical or physical stores for the user. For example, if a user application calls software component 18 to register a new physical store, information about that new store can be persisted into the registry, as shown in FIG. 15, for use when the store is opened and further manipulated by an application. Information that is persisted in the registry can include the store's name, priority, and information on how to open the store, i.e. which physical store provider to use.

One of the aspects of the described embodiment that gives a desired degree of flexibility is that certificate stores can be created in a number of different locations, e.g. a file system, the registry, and a database to name just a few. One aspect of the described embodiment defines so-called store providers that are programmed to interface with these different types of locations in which certificate stores might occur. Information about each of the providers that is associated with a physical store is kept in the registry (FIG. 15) when a physical store is created.

Figure 16:
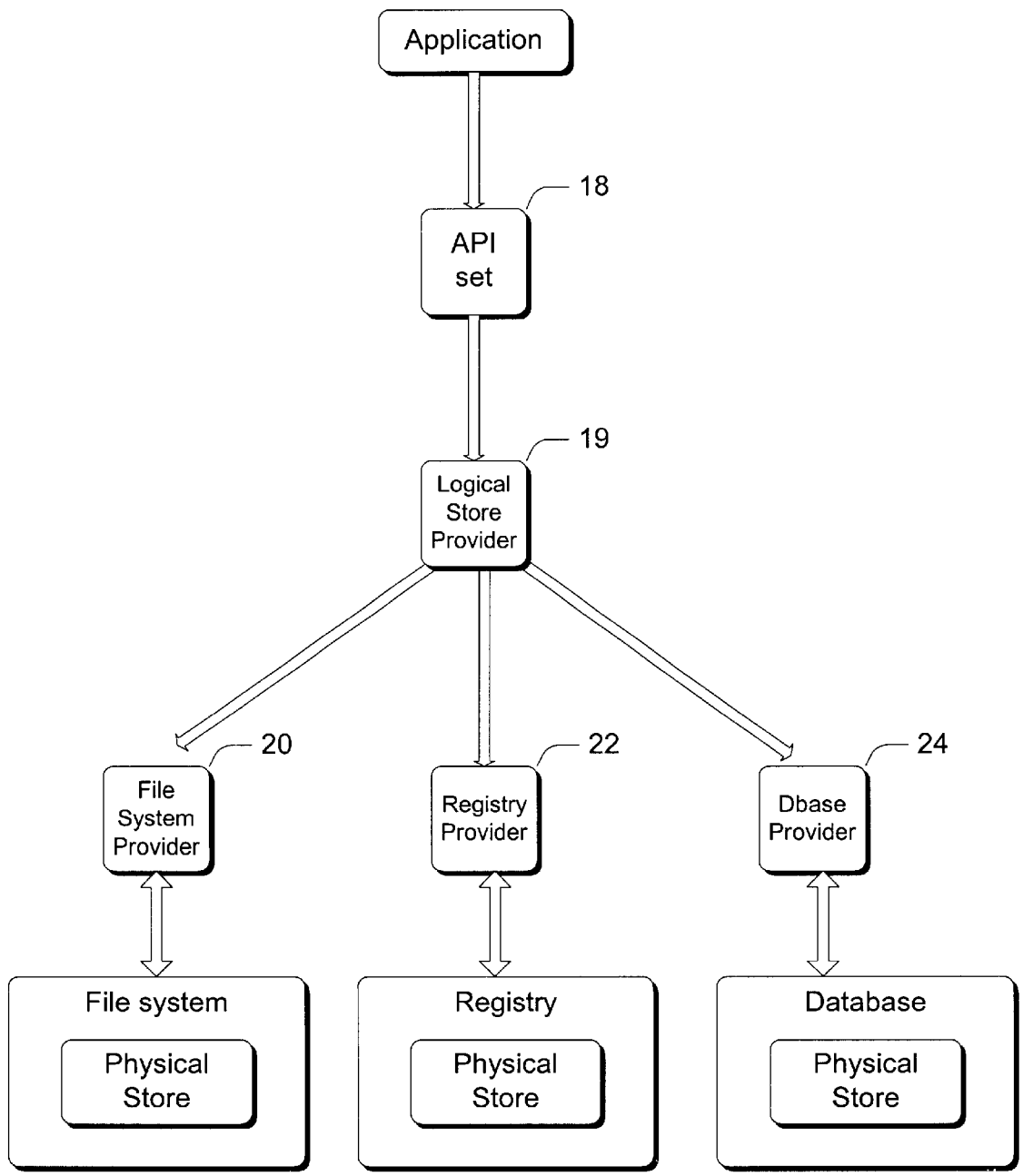
FIG. 16 is a diagram that illustrates architectural aspects of an embodiment of the invention.
Figure 17:
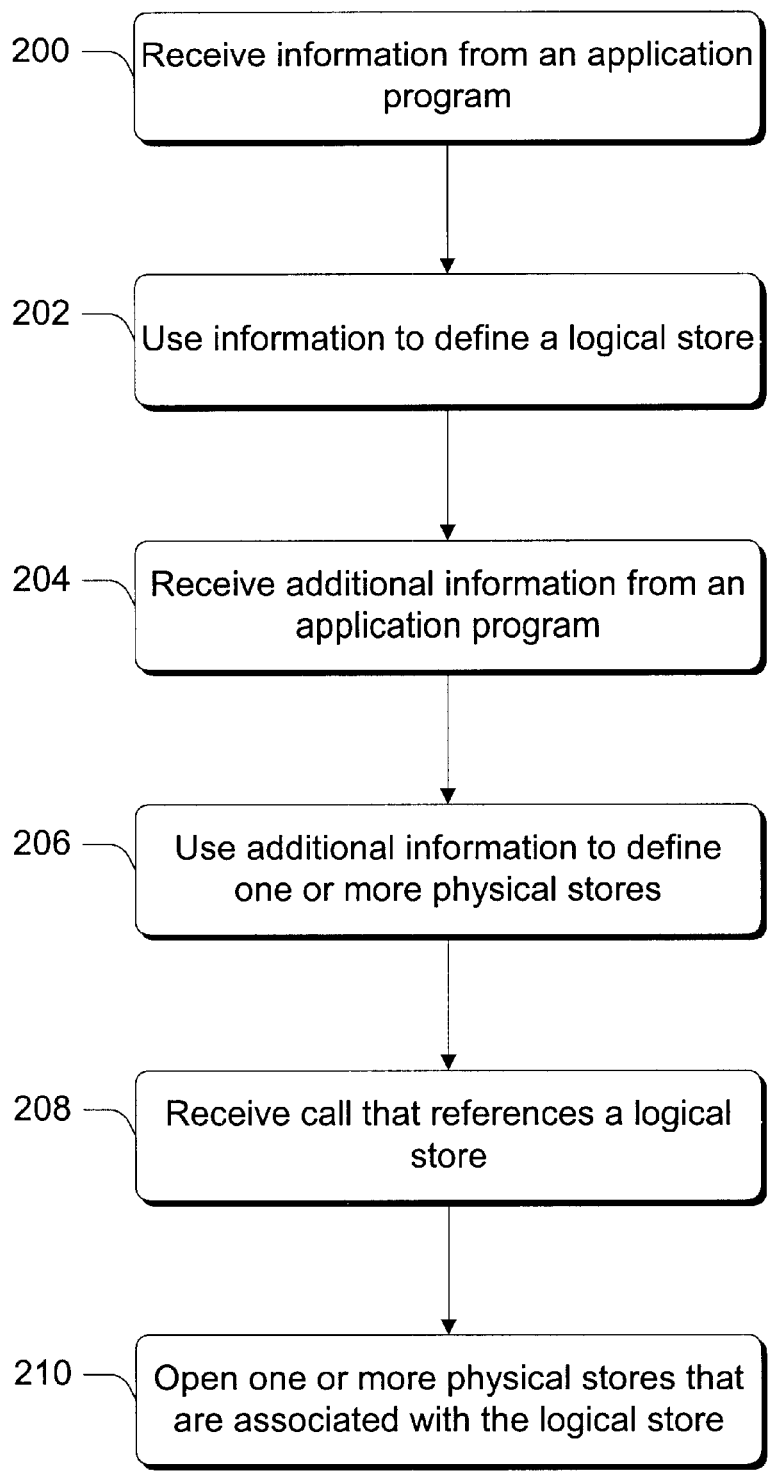
FIG. 17 is a flow diagram that describes steps in a method in accordance with one embodiment of the invention.

FIG. 16 shows one exemplary implementation that utilizes four such providers, i.e. a logical store provider 19, a file system provider 20, a registry provider 22, and a database provider 24. In the described embodiment, when an application wants to open a particular store, it calls an application programming interface "CertOpenStore", which then opens one or more stores, e.g. physical or logical, that are specified by a user. For example, a user might specify a certain logical store that in turn, has three physical stores underneath it. Each of the physical stores has its own defined protocol for access which is specifically programmed into the physical store provider that is associated with it. In the illustrated example, logical store provider 19 is called to open the user-specified logical store. The logical store provider 19 knows which physical store providers it needs to open the physical stores that are associated with it. Such information can be gleaned by the logical store provider from the registry (FIG. 15). The logical store provider 19 then makes calls to each of the store providers 20, 22, and 24. Each of the store providers 20–24, in turn, take the appropriate steps to open the stores with which they are associated. The application can then make additional calls to the application programming interface set 18 to access and manipulate the contents of the particular physical stores. The provider that is associated with each of the particular physical stores takes all of the appropriate steps to operate on the physical stores and return results to the client in a manner that is transparent to the application and the user. FIG. 17 shows a flow diagram that describes steps in a method for building and operating upon a hierarchical storage system in accordance with the described embodiment. Step 200 receives information from an application program and step 202 uses the information to define a logical store. The information can be any suitable information that can be utilized to assist in defining the logical store, e.g. store name, opening parameters (i.e. associated logical store provider) and the like. In the described embodiment, such information is received through one or more calls that can be made by an application program to a software module 18 (FIG. 16) that defines a set of application programming interfaces. Step 204 receives additional information from the application program and step 206 uses the information to define one or more physical stores that are associated with the logical store. Examples of such additional information are given above. As with the information that is collected for the logical store, the information for the physical stores is received, in the described embodiment, through one or more calls that can be made by an application program to software module 18. Steps 200–206 accordingly enable a user, through a suitable application program, to define their own unique hierarchical storage system for digital certificates.

With the hierarchical storage system having been defined, steps 208 and 210 enable the user to operate upon the physical stores that comprise the logical store. Specifically, step 208 receives a call from an application program that references a logical store. As an example, a user can call an application programming interface called "CertOpenStore" to open a logical store. Step 210 then opens one or more physical stores that are associated with the logical store. An example of an architecture that can achieve this function was described above in connection with FIG. 16.

Predefined System and Physical Stores

One aspect of the invention provides predefined system (logical) stores and physical stores for various locations. One advantage of providing such predefined stores is that each of the individual predefined stores can have a "role" or a function that is associated with it at its particular location. The table below describes some exemplary locations and the predefined logical and physical stores that are associated with each location:

| Location | Logical Store | Physical Store(s) |
| --- | --- | --- |
| Current User | My | Registry |
|  | Root | Registry, LocalMachine |
|  | Trust | Registry, GroupPolicy, LocalMachine |
|  | CA | Registry, GroupPolicy, LocalMachine |
|  | UserDS | LDAP useCertificate |
| Local Machine | My | Registry |
|  | Root | Registry, GroupPolicy |
|  | Trust | Registry, GroupPolicy |
|  | CA | Registry, GroupPolicy |
| Current Service | My | Registry |
|  | Root | Registry, LocalMachine |
|  | Trust | Registry, GroupPolicy, LocalMachine |
|  | CA | Registry, GroupPolicy, LocalMachine |
| Services | Servicename\My | Registry |
|  | Servicename\Root | Registry, LocalMachine |
|  | Servicename\Trust | Registry, LocalMachine |
|  | Servicename\CA | Registry, LocalMachine |
| Users | UserSID\My | Registry |

-continued

| Location | Logical Store | Physical Store(s) |
| --- | --- | --- |
|  | UserSID\Root | Registry, LocalMachine |
|  | UserSID\Trust | Registry, LocalMachine |
|  | UserSID\CA | Registry, LocalMachine |
| Current User Group Policy | My | Registry |
|  | Root | Registry |
|  | Trust | Registry |
|  | CA | Registry |
| Local Machine Group Policy | My | Registry |
|  | Root | Registry |
|  | Trust | Registry |
|  | CA | Registry |

In the above example, the predefined logical stores can have associated predefined roles. For example, the logical store "My" might be associated with physical stores that hold personal certificates for entities that any of the locations corresponds with. The "Root" logical store might be associated with physical stores that hold only trusted root certificates. Further, the "CA" logical store might be associated with physical stores that hold certificates for intermediate certification authorities.

External Stores

One aspect of the invention provides so-called external stores. External stores are functional to prevent all of a store's certificates from being copied into the store's cache when the store is opened. This is an improvement of past practices which were to read all of the store's certificates into cache memory when the store was opened. Now when a store is opened, its associated store provider can maintain the certificates outside of the store's cache. This way, one or more operations that are performed relative to a store need not necessarily be performed on all of the cached certificates. For example, a store provider can maintain an external database of store certificates, such as one provided by Microsoft's Certificate Server Database.

Protected Root Stores

One aspect of the invention provides for protected root stores. Recall that root stores are stores that can store the certificates of trusted entities. It is desirable to provide protection on these and other stores to prevent any application from modifying the root store. In the described embodiment, root stores are protected through the use of access control lists or ACLs. This prevents unauthorized entities from modifying a particular root store. For example, through the use of ACLs, only a service or a local machine can be defined as having the ability to modify a root store. The described embodiment presents various organizations of digital certificate stores and techniques of operating upon and manipulating the stores that greatly facilitate their use in maintaining, organizing and overseeing the management of digital certificates. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of operating upon one or more physical stores that hold one or more objects that are used for evidentiary purposes comprising:

defining a hierarchy of stores at least one of which comprises a logical store having associated therewith two or more physical stores that are accessible through the logical store, the physical stores containing one or more of the objects;

creating a context link between at least two of the physical stores, one of the objects in one of said two or more physical stores gettinig its context from one of the objects in another of said two or more physical stores via the context link;

receiving a call from an application program that contains a reference to the logical store; and responsive to receiving the call, opening the one or more physical stores that are associated with the logical store.

2. The method of claim 1, wherein said opening comprises calling one or more providers that are programmed to interface with and open the ig respective one or more physical stores, the providers being adapted to open different types of physical stores.

3. The method of claim 2, wherein said opening further comprises, prior to calling said one or more providers, calling a logical store provider that is associated with the logical store, the logical store being programmed to know which physical stores to open, the calling of the one or more providers taking place with the logical store.

4. The method of claim 1, wherein said opening comprises opening physical stores that are disposed across a machine boundary from one another.

5. One or more computer-readable media having computer-readable instructions thereon which, when executed by a computer, perform the steps of claim 1.

6. A hierarchical storage system embodied on one or more computer-readable media for holding objects used for evidentiary purposes, the system comprising:

a logical store; and a plurality of physical and/or logical stores associated with and accessible through the logical store, the physical stores being configured to hold one or more objects that are used for evidentiary purposes, wherein some of the logical stores are arranged into a collection store having two or more physical and/or logical stores that are organized so that an individual operation performed on one store of the collection store is performed on other stores of the collection store.

7. The hierarchical storage system of claim 6 further comprising another logical store, at least one of the plurality of physical and/or logical stores being associated with both logical stores.

8. The hierarchical storage system of claim 7, wherein the logical stores with which said plurality of physical and/or logical stores are associated are disposed across a machine boundary from one another.

9. The hierarchical storage system of claim 6, wherein the logical stores are user-configurable.

10. The hierarchical storage system of claim 9, wherein the logical stores are configured for the addition of user-specified physical stores.

11. The hierarchical storage system of claim 9, wherein the logical stores are configured for the removal of user-specified physical stores.

12. The hierarchical storage system of claim 6 further comprising a context link between two of the physical stores, one of the evidentiary objects in one of the two physical stores getting its context from one of the evidentiary objects in the other of the two physical stores via the context link.

13. The hierarchical storage system of claim 12, wherein the two physical stores are disposed across a machine boundary from one another.

14. The hierarchical storage system of claim 6, wherein said one or more computer-readable media comprise a plurality of different types of computer-readable media.

15. The hierarchical storage system of claim 6, wherein said one or more evidentiary objects comprise digital certificates.

16. An application programming interface that is callable by an application program to operate upon the hierarchical storage system of claim 6, the application programming interface being callable to open said one or more physical and/or logical stores via the logical store.

17. The hierarchical storage system of claim 6, wherein at least one of the stores is protected.

18. A hierarchical storage system embodied on one or more computer-readable media for holding objects used for evidentiary purposes, the system comprising:

a logical store;

a plurality of physical and/or logical stores associated with and accessible through the logical store, the physical stores being configured to hold one or more objects that are used for evidentiary purposes; and a context link between two of the physical stores, one of the evidentiary objects in one of the two physical stores getting its context from one of the evidentiary objects in the other of the two physical stores via the context link.

19. The hierarchical storage system of claim 18, wherein the two physical stores are disposed across a machine boundary from one another.

20. The hierarchical storage system of claim 18 further comprising another logical store, at least one of the plurality of physical and/or logical stores being associated with both logical stores.

21. The hierarchical storage system of claim 20, wherein the logical stores with which said plurality of physical and/or logical stores are associated are disposed across a machine boundary from one another.

22. The hierarchical storage system of claim 18, wherein the logical stores are user-configurable.

23. The hierarchical storage system of claim 22, wherein the logical stores are configured for the addition of user-specified physical stores.

24. The hierarchical storage system of claim 22, wherein the logical stores are configured for the removal of user-specified physical stores.

25. The hierarchical storage system of claim 18, wherein said one or more computer-readable media comprise a plurality of different types of computer-readable media.

26. The hierarchical storage system of claim 18, wherein said one or more evidentiary objects comprise digital certificates.

27. An application programming interface that is callable by an application program to operate upon the hierarchical storage system of claim 18, the application programming interface being callable to open said one or more physical and/or logical stores via the logical store.

28. The hierarchical storage system of claim 18, wherein at least one of the stores is protected.

29. A hierarchical storage system embodied on one or more computer-readable media for holding objects used for evidentiary purposes, the system comprising:

a first logical store and a second logical store associated with and hierarchically beneath the first logical store; and one or more physical and/or additional logical stores associated with and accessible through the at least one of the first and second logical stores, the physical stores being configured to hold one or more objects that are used for evidentiary purposes.

30. The hierarchical storage system of claim 29, wherein said one or more physical and/or additional logical stores comprise a plurality of physical and/or logical stores.

31. The hierarchical storage system of claim 30, wherein at least one of the physical and/or additional logical stores is located across a machine boundary from another of the physical stores.

32. The hierarchical storage system of claim 30, wherein some of the logical stores are arranged into a collection store having two or more physical and/or logical stores that are organized so that an individual operation performed on one store of the collection store is performed on other stores of the collection store.

33. The hierarchical storage system of claim 30, wherein at least one of the plurality of physical and/or additional logical stores is associated with at least two logical stores.

34. The hierarchical storage system of claim 33, wherein the logical stores with which said at least one of the plurality of physical and/or additional logical stores are associated are disposed across a machine boundary from one another.

35. The hierarchical storage system of claim 29, wherein the logical stores are user-configurable.

36. The hierarchical storage system of claim 35, wherein the logical stores are configured for the addition of user-specified physical stores.

37. The hierarchical storage system of claim 35, wherein the logical stores are configured for the removal of user-specified physical stores.

38. The hierarchical storage system of claim 29, wherein said one or more physical and/or additional logical stores comprise a plurality of physical and/or logical stores, and further comprising a context link between two of the physical stores, one of the evidentiary objects in one of the two physical stores getting its context from one of the evidentiary objects in the other of the two physical stores via the context link.

39. The hierarchical storage system of claim 38, wherein the two physical stores having the context link are disposed across a machine boundary from one another.

40. The hierarchical storage system of claim 29, wherein said one or more computer-readable media comprise a plurality of different types of computer-readable media.

41. The hierarchical storage system of claim 29, wherein said one or more evidentiary objects comprise digital certificates.

42. An application programming interface that is callable by an application program to operate upon the hierarchical storage system of claim 29, the application programming interface being callable to open said one or more physical and/or logical stores via the logical store.

43. The hierarchical storage system of claim 29, wherein at least one of the stores is protected.

\* \* \* \* \*